United States Patent
Cordero et al.

(10) Patent No.: US 10,592,332 B2
(45) Date of Patent: *Mar. 17, 2020

(54) AUTO-DISABLING DRAM ERROR CHECKING ON THRESHOLD

(71) Applicant: International Business Machines Corporation, Armonk, NY (US)

(72) Inventors: Edgar R. Cordero, Round Rock, TX (US); Marc A. Gollub, Pflugerville, TX (US); Warren E. Maule, Cedar Park, TX (US); Lucas W. Mulkey, Austin, TX (US); Anuwat Saetow, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/967,609

(22) Filed: May 1, 2018

(65) Prior Publication Data

US 2018/0246781 A1    Aug. 30, 2018

Related U.S. Application Data

(63) Continuation of application No. 15/207,679, filed on Jul. 12, 2016, now Pat. No. 9,996,414.

(51) Int. Cl.
*G06F 11/10* (2006.01)
(52) U.S. Cl.
CPC ...... *G06F 11/1004* (2013.01); *G06F 11/1052* (2013.01)

(58) Field of Classification Search
CPC .............................. G06F 11/10; G06F 11/1004
See application file for complete search history.

(56) References Cited

U.S. PATENT DOCUMENTS

| 6,597,665 | B1 | 7/2003 | Van Loo et al. | |
| 8,196,009 | B2 * | 6/2012 | Bains ................ | G06F 11/1004 714/758 |
| 8,321,778 | B2 * | 11/2012 | Bains ................ | G06F 11/1004 714/763 |
| 8,645,811 | B2 * | 2/2014 | Sauber .............. | G06F 11/1004 714/48 |

(Continued)

OTHER PUBLICATIONS

List of IBM Patents or Patent Applictions Treated As Related; (Appendix P), Filed May 1, 2018, 2 pages.

(Continued)

*Primary Examiner* — Joseph R Kudirka
(74) *Attorney, Agent, or Firm* — Cantor Colburn LLP; Nathan Rau (57) ABSTRACT

An aspect includes a method for auto-disabling dynamic random access memory (DRAM) error checking based on a threshold. A method includes receiving data at a DRAM and executing error checking logic based on the data. The error checking logic detects an error condition in the data and it is determined, at the DRAM, whether detecting the error condition in the data causes an error threshold to be reached. The error checking logic is disabled at the DRAM in response to determining that detecting the error condition in the data causes the error the error threshold to be reached.

20 Claims, 4 Drawing Sheets

(56) References Cited

U.S. PATENT DOCUMENTS

| | | |
|---|---|---|
| 8,687,301 B1 | 4/2014 | Zhang et al. |
| 8,707,127 B2 | 4/2014 | Tran et al. |
| 8,738,993 B2 | 5/2014 | Bains |
| 8,904,260 B2 | 12/2014 | Tran et al. |
| 2015/0139251 A1 | 5/2015 | Tzeng |
| 2018/0018217 A1 | 1/2018 | Cordero et al. |

OTHER PUBLICATIONS

Dilger, "Specification, Military, and Key Code JEJ.." (1991), 102 pages.
Tilsch et al., . "Considerations on automation of coating machines." Advanced Optical Technologies 4.2 (2015): 209-219.

\* cited by examiner

AUTO-DISABLING DRAM ERROR CHECKING ON THRESHOLD

DOMESTIC PRIORITY

This application is a continuation of U.S. patent application Ser. No. 15/207,679, filed Jul. 12, 2016, now U.S. Pat. No. 9,996,414 issued Jun. 12, 2018, the content of which is incorporated by reference herein in its entirety.

BACKGROUND

The present invention relates to computer memory systems, and more specifically, to auto-disabling dynamic random access memory (DRAM) error checking based on a threshold.

Double date rate fourth-generation synchronous dynamic random-access memory (DDR4) is a type of dynamic random-access memory (DRAM) that supports a cyclical redundancy check (CRC) on write data that is received at the DRAM from a memory controller. CRC is an error-detecting code that uses a remainder of a polynomial division of a block of data, such as the write data received from a memory controller, to detect accidental changes to the data. The DRAM sends an alert to the memory controller when a CRC error is detected, so that the memory controller can retry the write. A DDR4 also supports parity checking on the command/address bus(ses) between the DRAM and the memory controller. The DRAM sends an alert to the memory controller when a parity error is detected, so that the memory controller can resend the command and/or address.

SUMMARY

Embodiments include a method, system, and computer program product for auto-disabling dynamic random access memory (DRAM) error checking based on a threshold. A method includes receiving data at a DRAM from a memory controller and executing error checking logic based on the data. The error checking logic detects and error condition in the data and it is determined, at the DRAM, whether detecting the error condition in the data causes an error threshold to be reached. The error checking logic is disabled at the DRAM in response to determining that detecting the error condition in the data causes the error threshold to be reached. The error condition is communicated to the memory controller in response to determining that detecting the error condition does not cause the error threshold to be reached.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to performing error checking on data received at a dynamic random access memory (DRAM) from a memory controller. In one or more embodiments, once a DRAM detects a hard fail condition, the DRAM turns off error checking to prevent the memory controller from entering a retry loop. The resulting corrupted data (if any) is handled using an error-correcting code (ECC) when the data is read from the DRAM. Thus, once an error threshold is reached, additional errors are handled as memory ECC errors. This new approach simplifies the intelligence required by the memory controller to handle single pin failures that can lead to continuous write data CRC errors and/or continuous command/address parity errors.

As described previously, double date rate fourth-generation synchronous DRAM (DDR4) is a type of DRAM that supports CRC checking of write data, and parity checking of command and address data. When the conventional DDR4 detects a CRC error in the write data, it sends an alert to the memory controller so that the memory controller can resend the data. This type of notification can work for the occasional bit flip on the write interface, however a hard fail on that interface (e.g., a bad DRAM pin, a bad connector pin) can cause an endless retry loop leading to a system hang or timeout. To prevent this from happening, the memory controller can have more intelligence, such as logic to detect a threshold of alerts, to quiesce mainline traffic, to perform mode register set (MRS) reads to determine which DRAM had the problem, to issue MRS commands to instruct the failing DRAM to disable CRC checking, and then to resume mainline traffic.

A conventional DDR4 can be configured to disable parity checking of command and address data after the first parity error is detected. This can prevent the memory controller from getting stuck in a retry loop for a hard fail. However, in order to continue checking parity after a single bit flip, the memory controller would have to quiesce mainline traffic, perform MRS reads to determine which DRAM had the problem, issue MRS commands to instruct the failing DRAM to re-enable command/address parity checking, and then resume mainline traffic. The DRAM can be configured to keep parity checking enabled after each error, but then this can result in the same complexity in the memory controller as described previously to handle the continuous CRC case.

Embodiments described herein provide for the auto-disabling of error checking in a DRAM based on an error threshold being reached. In one or more embodiments, the DRAM includes logic to determine when the error checking should be disabled as well as logic to disable the error checking. This can avoid the complexities described above and result in performance improvements in a memory system. Embodiments can also provide improvements to reliability, availability, and serviceability (RAS) of the memory system, for example, by preventing the endless loop and system timeout described previously.

Figure 1:
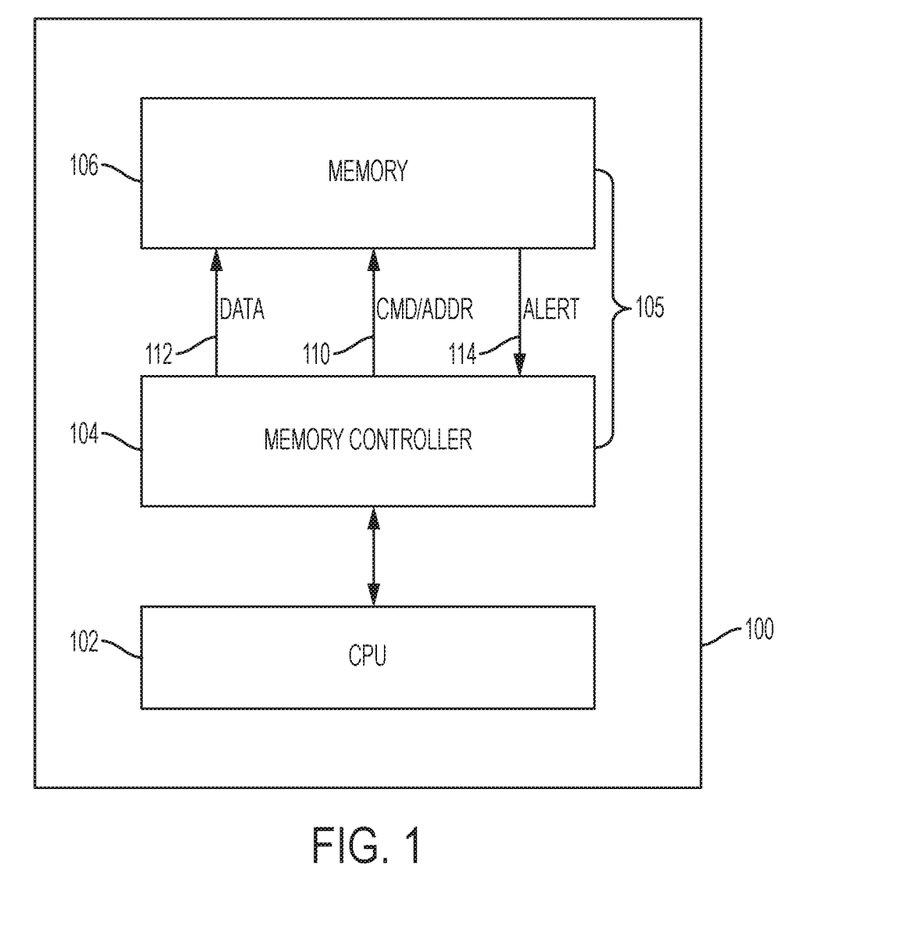
FIG. 1 is a block diagram of an exemplary system according to one or more embodiments of the invention.

FIG. 1 illustrates a block diagram of a system 100, which is a computer system that supports auto-disabling DRAM error checking based on a threshold. The system 100 depicted in FIG. 1 includes a computer processor 102, memory 106 including multiple memory devices (e.g., DRAMs), and a memory controller 104 for reading data from and writing data to the memory 106 via an interface that includes a data bus 112, a command/address bus 110, and an alert bus 114. In one or more embodiments, CRC checking is performed by the memory 106 (e.g., a DDR4) on write data received from the memory controller 104 via the data bus 112. In addition, parity checking is performed by the memory 106 on command and address data received via the command/address bus 110. Collectively, the memory controller 104 and the memory 106 are referred to as a memory system 105. The computer processor 102 can be a single core or multi-core processor. In one or more embodiments the memory controller 104 is coupled to the computer processor 102 and receives read or write requests from the computer processor 102.

The system 100 is one example of a configuration that may be utilized to perform the processing described herein. Although the system 100 has been depicted with only a memory 106, memory controller 104, and computer processor 102, it will be understood that other embodiments would also operate in other systems including additional elements, e.g., multiple computers processors 102 and multiple levels of memory 106. In one or more embodiments, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
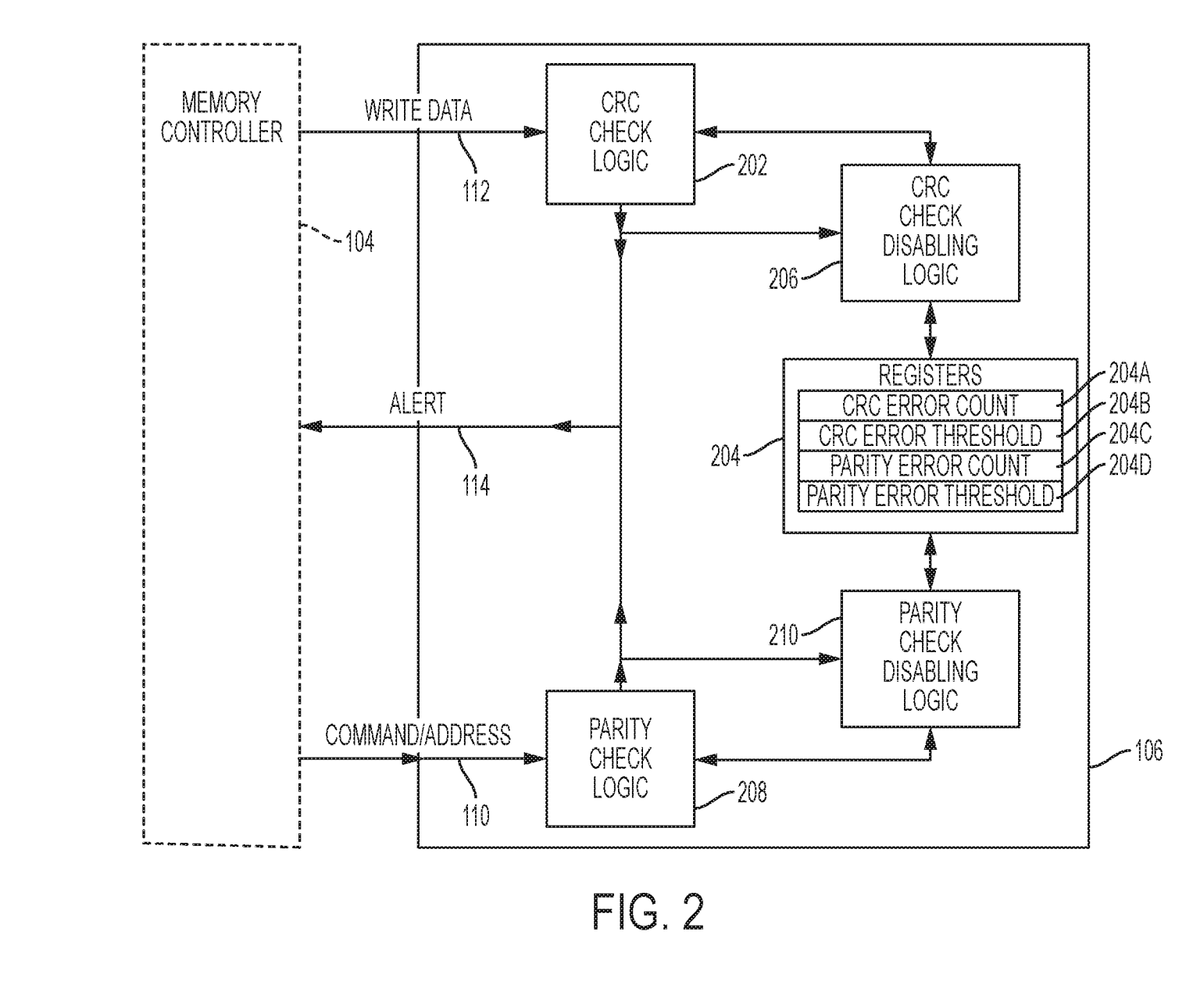
FIG. 2 is a block diagram of a memory according to one or more embodiments of the invention.

Turning now to FIG. 2, a block diagram of a memory 106 is generally shown in accordance with one or more embodiments. The memory 106 shown in FIG. 2 illustrates the contents of one DRAM in accordance with one or more embodiments. It should be understood that the memory 106 can contain a plurality of DRAMs each having the logic shown in FIG. 2. The memory 106 shown in FIG. 2 includes CRC check logic 202, CRC check disabling logic 206, parity check logic 208, parity check disabling logic 210, and registers 204. As shown in FIG. 2, write data is received by the memory 106 via a data bus 112 and input to CRC check logic 202, which can be implemented using continuous write data CRC checking logic contained in contemporary DDR4s. If the CRC check logic 202 detects an error, the memory controller 104 is notified of the error via the alert bus 114. Also as shown in FIG. 2, command and address data is received by the memory 106 via a command/address bus 110 and input to parity check logic 208, which can be implemented using continuous command/address parity checking logic found in contemporary DDR4s. If the parity check logic 208 detects an error, the memory controller 104 is notified of the error via the alert bus 114. In response to receiving the alert(s) the memory controller 104 can resend the write data and/or command/address data.

As shown in the embodiment in FIG. 2, the memory 106 also includes CRC check disabling logic 206 that can monitor the CRC check logic 202. The CRC check disabling logic 206 can disable the CRC check logic 202 when the DRAM detects "n" CRC errors out of the last "m" CRC checks, where "n" and "m" are configurable using mode register set (MRS) commands. As shown in FIG. 2, a CRC error count is stored in a CRC error count register 204A and a CRC error threshold (e.g., "n" and "m") is stored in a CRC error threshold register 204B. In one or more embodiments, if the CRC check disabling logic 206 detects that "4" out of the last "10" checks had a CRC error, then the CRC check disabling logic 206 turns off the CRC check logic 202 in the memory 106.

Also as shown in the embodiment in FIG. 2, the memory 106 includes parity check disabling logic 210 that can monitor the parity check logic 208. The parity check disabling logic 210 can disable the parity check logic 208 when the DRAM detects "x" parity errors out of the last "y" parity checks, where "x" and "y" are configurable using mode register set (MRS) commands. As shown in FIG. 2, a parity error count is stored in a parity error count register 204C and a parity error threshold (e.g., "x" and "y") is stored in a parity error threshold register 204C. In one or more embodiments, if the parity check disabling logic 210 detects that "4" out of the last "10" checks had a parity error, then the parity check disabling logic 210 turns off the parity check logic 208 in the memory 106.

Adding the disabling of error checking on thresholds into the DRAMs, allows a simple design in the memory controller 104. In one or more embodiments, the memory controller 104 issues a retry when an alert signal is detected from the memory 106 regardless of whether the alert is due to a CRC or parity error. In addition, alert signals from a plurality of DRAMs (e.g., all DRAMs connected to the memory controller 104) can be OR'd together into a single alert signal to the memory controller 104, to minimize memory controller inputs. In contemporary memory systems, since the DRAMs are set up for continuous checking, the memory controller 104 does not need any intelligence to identify a DRAM that had a single bit flip (CRC or parity), in order to re-enable the error checking in the DRAM. In one or more embodiments described herein, since the DRAMs turn off their own checking on a threshold that they detect independently of the memory controller 104, the memory controller 104 does not need any intelligence to identify the DRAM that had a continuous error in order to disable the error checking in the DRAM. In one or more embodiments, once the error checking is disabled, the command/address error and/or write data errors result in corrupted data in the DRAM, which the memory controller 104 handles using typical memory ECC features such as, but not limited to chip mark or symbol correction.

Figure 3:
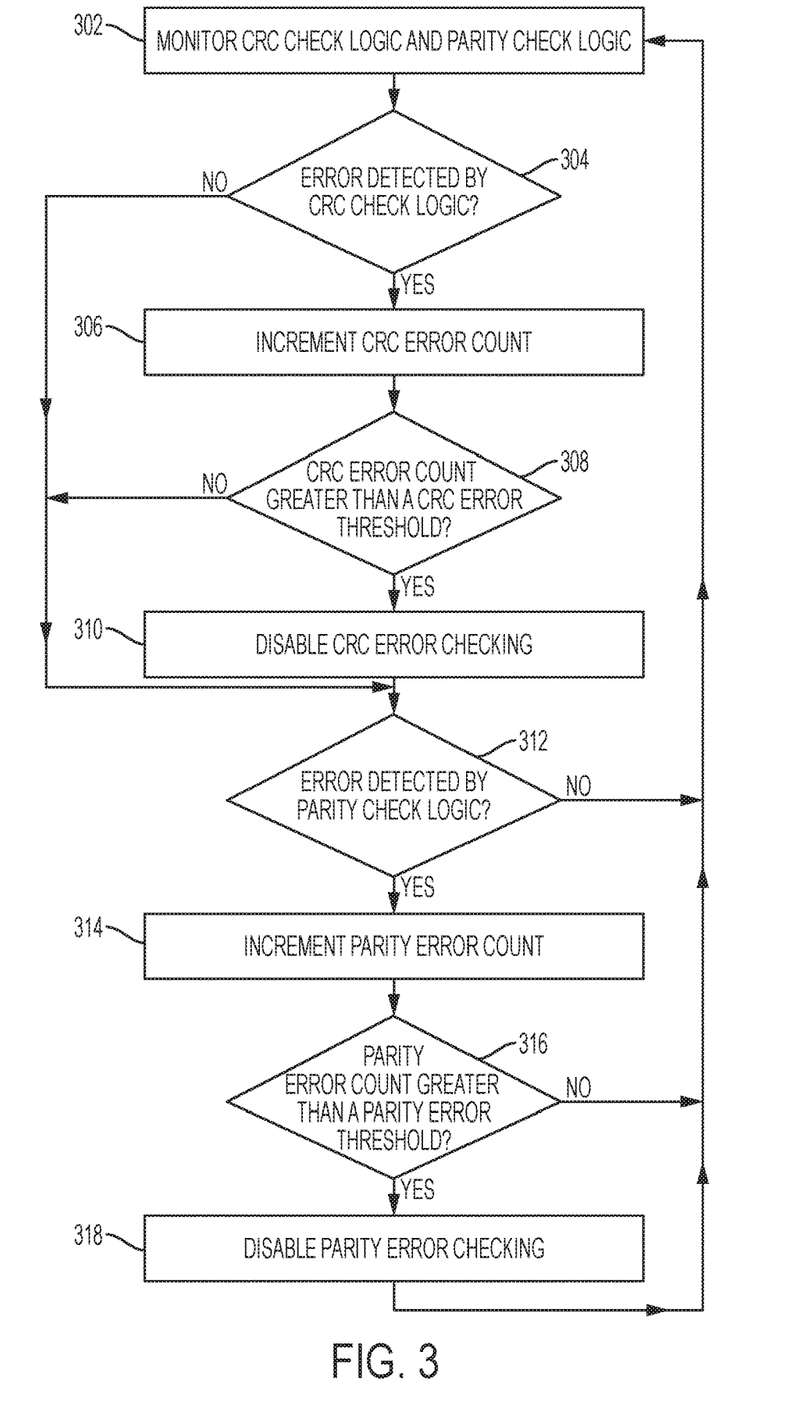
FIG. 3 is a process flow of auto-disabling dynamic random access memory (DRAM) error checking based on a threshold according to one or more embodiments of the invention.

Turning now to FIG. 3, a process flow of auto-disabling, by a DRAM, DRAM error checking based on a threshold is generally shown in accordance with one or more embodiments. The processing shown in FIG. 3 is performed by one or more embodiments by the CRC check disabling logic 206 and parity check disabling logic 210 shown in FIG. 2. At block 302, the CRC check logic 202 and parity check logic 208 are monitored for the number of checks performed and the number of errors detected. In one or more embodiments, this information is stored in one or more of the registers 204 shown in FIG. 2. It is determined at block 304, whether a CRC error was detected on write data that was received from the memory controller. If a CRC error was detected, then processing continues at block 306, with a CRC error count being incremented at block 306 and a determination about whether the CRC error count exceeds a CRC error threshold (or whether an error threshold been reached) being performed at block 308. Based on determining, at block 308, that the CRC error count exceeds the CRC error threshold, block 310 is performed to disable the CRC error checking. Processing then continues at block 312.

Based on determining, at block 308, that the CRC error count does not exceed the CRC error threshold, processing continues at block 312. Based on determining at block 304, that a CRC error was not detected on write data that was received from the memory controller, processing continues at block 312.

At block 312, it is determined whether a parity error was detected on command/address data that was received from the memory controller. If a parity error was detected, then processing continues at block 314, with a parity error count being incremented at block 314 and a determination about whether the parity error count exceeds a parity error threshold (or whether an error threshold been reached) being performed at block 316. Based on determining, at block 316, that the parity error count exceeds the parity error threshold, block 318 is performed to disable the parity error checking. Processing then continues at block 302 to continue monitoring the CRC check logic and the parity check logic.

Based on determining, at block 316, that the parity error count does not exceed the parity error threshold, processing continues at block 302 to continue monitoring the CRC check logic and the parity check logic. Based on determining at block 312, that a parity error was not detected on command/address data that was received from the memory controller, processing continues at block 302 to continue monitoring the CRC check logic and the parity check logic. In one more embodiments, the monitoring of the CRC check logic at block 302 is halted if the CRC check logic is disabled at block 310, and the monitoring of the parity logic at block 302 is halted if the parity check logic is disabled at block 318.

Embodiments described herein provide the DRAM with the ability to decide, independently of the memory controller, when to disable the error detection. This decision is based on a programmable threshold of error detected by the DRAM which would indicate a hard/persistent error.

In one or more embodiments, the system looks at "z" inputs (write data and/or command/address) from the memory controller and compares the number of errors in the "z" inputs to an error threshold "e". If more than "e" errors were found in the "z" inputs, then the error checking logic is disabled. After "z" inputs the error counter is reset. For example, the system can look at 10 inputs and disable the error checking logic if more than 4 errors are found in the 10 inputs. Then the counter is cleared and the next 10 inputs are analyzed to see if there are more than 4 errors.

In one or more other embodiments, the system uses a sliding window and analyzes the last "z" inputs from the memory controller and compares the number of errors in the last "z" inputs to an error threshold "e". If more than "e" errors were detected in the last "z" inputs, then the error checking logic is disabled. The error threshold is programmable and can be set and modified, for example, using an MRS command.

Figure 4:
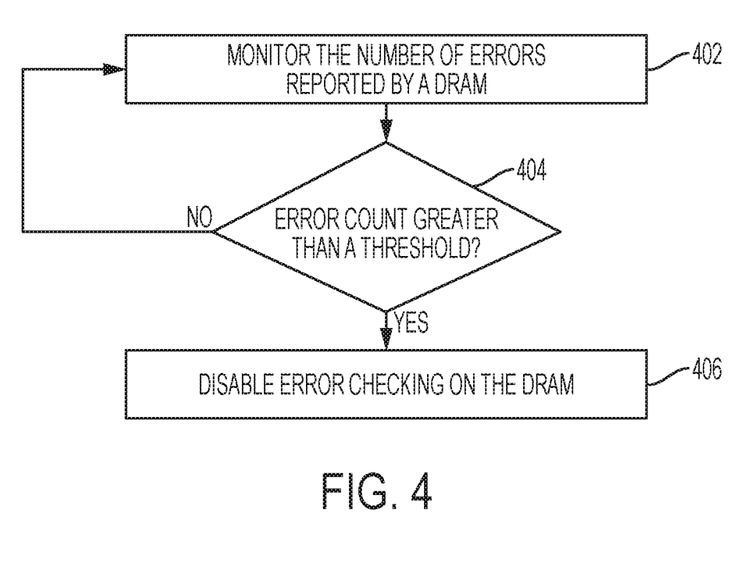
FIG. 4 is a process flow of auto-disabling DRAM error checking based on a threshold according to one or more embodiments of the invention.

Turning now to FIG. 4, a process flow of auto-disabling, by a memory controller, DRAM error checking based on a threshold is generally shown in accordance with one or more embodiments. At block 402, the number of errors reported by a DRAM is monitored by the memory controller. At block 404, it is determined if the error counts is greater than (or meets) an error threshold. If the error count meets the error threshold, processing continues at block 406 to disable the error checking on the DRAM. Otherwise, processing continues at block 402. A memory controller can be sending write data and command/address data to a plurality of DRAMs and thus, may need to perform the processing described earlier to determine which DRAM is reporting the error(s). For example, the memory controller can quiesce mainline traffic to the DRAMS and perform a MRS read to the DRAMs to determine which DRAM is reporting the errors. The memory controller can then issue a MRS command(s) to instruct the failing DRAM to disable CRC (or parity) checking, and then the memory controller can resume mainline traffic.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of disabling error checking in a dynamic random access memory (DRAM), the method comprising:
    receiving data at the DRAM;
    executing, at the DRAM, error checking logic based on the data;
    detecting, by the error checking logic, an error condition in the data;
    determining, at the DRAM, whether detecting the error condition in the data causes an error threshold to be reached; and
    disabling the error checking logic at the DRAM in response to determining that detecting the error condition in the data causes the error threshold to be reached.

2. The method of claim 1, wherein the disabling is performed by the DRAM.

3. The method of claim 1, wherein the error condition is a parity error and the data includes command or address data.

4. The method of claim 1, wherein the error condition is a cyclical redundancy check (CRC) error and the data includes write data.

5. The method of claim 1, wherein the DRAM is a double data rate fourth-generation synchronous DRAM (DDR4).

6. The method of claim 1, wherein the error threshold is determined to be reached based on a number of the error conditions previously detected exceeding a threshold count.

7. The method of claim 1, further comprising:
communicating the error condition to a memory controller in response to determining that detecting the error condition did not cause the error threshold to be reached, wherein the communicating is via an alert signal.

8. The method of claim 7, wherein the method further comprises, in response to the communicating, receiving the data at the DRAM from the memory controller.

9. A memory system comprising:
a memory device, the memory device including a dynamic random access memory (DRAM) configured for:
receiving data at the DRAM;
executing, at the DRAM, error checking logic based on the data;
detecting, by the error checking logic, an error condition in the data;
determining, at the DRAM, whether detecting the error condition in the data causes an error threshold to be reached; and
disabling the error checking logic at the DRAM in response to determining that detecting the error condition in the data causes the error threshold to be reached.

10. The system of claim 9, wherein the error condition is a parity error and the data includes command or address data.

11. The system of claim 9, wherein the error condition is a cyclical redundancy check (CRC) error and the data includes write data.

12. The system of claim 9, wherein the DRAM is a double data rate fourth-generation synchronous DRAM (DDR4).

13. The system of claim 9, wherein the error threshold is determined to be reached based on a number of the error conditions previously detected exceeding a threshold count.

14. The system of claim 9, wherein the DRAM is further configured for communicating the error condition to a memory controller in response to determining that detecting the error condition did not cause the error threshold to be reached, wherein the communicating is via an alert signal.

15. The system of claim 14, wherein the DRAM is further configured for, in response to the communicating, receiving the data at the DRAM from the memory controller.

16. A computer program product for disabling error checking in a dynamic random access memory (DRAM), the computer program product comprising a computer readable storage medium having program instructions embodied therewith, the program instructions executable by processing circuitry to cause the processing circuitry to:
receive data at the DRAM;
execute, at the DRAM, error checking logic based on the data;
detect, by the error checking logic, an error condition in the data;
determine, at the DRAM, whether detecting the error condition in the data causes an error threshold to be reached; and
disable the error checking logic at the DRAM in response to determining that detecting the error condition in the data causes the error threshold to be reached.

17. The computer program product of claim 16, wherein the error condition is a parity error and the data includes command or address data.

18. The computer program product of claim 16, wherein the error condition is a cyclical redundancy check (CRC) error and the data includes write data.

19. The computer program product of claim 16, wherein the DRAM is a double data rate fourth-generation synchronous DRAM (DDR4).

20. The computer program product of claim 16, wherein the error threshold is determined to be reached based on a number of the error conditions previously detected exceeding a threshold count.

* * * * *